US008573822B2

(12) United States Patent
Ishihara

(10) Patent No.: US 8,573,822 B2
(45) Date of Patent: Nov. 5, 2013

(54) VEHICULAR LAMP

(75) Inventor: Yuuji Ishihara, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 248 days.

(21) Appl. No.: 13/111,096

(22) Filed: May 19, 2011

(65) Prior Publication Data

US 2011/0292671 A1 Dec. 1, 2011

(30) Foreign Application Priority Data

May 26, 2010 (JP) ................................ 2010-120155

(51) Int. Cl.

*F21V 5/04* (2006.01)
*F21V 21/00* (2006.01)
*B60Q 1/04* (2006.01)

(52) U.S. Cl.

USPC ............ 362/522; 362/545; 362/240; 362/246

(58) Field of Classification Search

USPC ............ 362/240, 244, 246, 249.02, 308, 309, 362/311.02, 311.06, 326, 327, 329, 355, 362/511, 520–522, 544, 545

See application file for complete search history.

(56) References Cited

U.S. PATENT DOCUMENTS

| | | | | |
|---|---|---|---|---|
| 6,755,556 | B2 * | 6/2004 | Gasquet et al. | 362/329 |
| 7,270,454 | B2 * | 9/2007 | Amano | 362/522 |
| 2003/0156417 | A1 * | 8/2003 | Gasquet et al. | 362/329 |
| 2005/0152153 | A1 * | 7/2005 | Amano | 362/520 |

FOREIGN PATENT DOCUMENTS

JP 2005-203111 7/2005

* cited by examiner

*Primary Examiner* — Thomas Sember

(74) *Attorney, Agent, or Firm* — Fish & Richardson P.C.

(57) ABSTRACT

In a vehicular lamp, a first zone includes a first incident portion disposed on a radiation axis. A first light guide portion guides light incident from the first incident portion forward. A first radiation portion formed from a first concave surface and a second concave surface deflects the light from the first light guide portion toward a lamp optical axis side and radiates such light forward in a diffused manner. A second zone includes a cylindrical second incident portion disposed on an outer side of the first incident portion. A second light guide portion that is longer in the direction of the radiation axis than the first light guide portion guides light incident from the second incident portion forward. A cylindrical second radiation portion radiates the light from the second light guide portion forward.

5 Claims, 5 Drawing Sheets

VEHICULAR LAMP

CROSS REFERENCE TO RELATED APPLICATION(S)

This application claims the benefit of priority of Japanese Patent Application No. 2010-120155 filed on May 26, 2010, the disclosure of which is incorporated herein in its entirety.

TECHNICAL FIELD

The present disclosure relates to a vehicular lamp of an automobile or the like, and more specifically relates to a vehicular lamp in which light from a slantingly disposed LED light source is deflected toward a lamp optical axis direction by an inner lens disposed nearby.

BACKGROUND

A conventional vehicular lamp includes multiple light emitting elements arranged facing forward on a lamp optical axis that extends in a lamp front-rear direction, and a translucent member that is arranged on a front side of the light emitting element (see, for example, Japanese Patent Application Laid-Open (Kokai) No. 2005-203111). The vehicular lamp directly radiates forward light from the light emitting element in a center zone of the translucent member positioned near the optical axis, and radiates forward light from the light emitting element in a surrounding zone positioned around the center zone by internally reflecting such light at a rear surface of the translucent member. Thus, the surrounding zone appears to shine when the lamp is lit, which improves the appearance of the vehicular lamp.

SUMMARY

If a radiation axis of the light emitting element in the vehicular lamp described above is substantially inclined and slantingly disposed with respect to the lamp optical axis, performing a light distribution control of light from the light emitting element with good precision can become difficult and the use efficiency of light can be low.

The subject matter of the present disclosure was devised to solve the problem described above, and to provide a vehicular lamp that can perform a light distribution control of light from a slantingly disposed light emitting element with good precision and thereby improve a use efficiency of light from the light emitting element.

In certain aspects, the disclosure features a vehicular lamp that includes a semiconductor light emitting element disposed within a lamp chamber formed from a lamp body and a front cover, with a radiation axis of the semiconductor light emitting element inclined with respect to a lamp optical axis; and a lens member that is disposed in front of the light emitting element. The vehicular lamp is characterized in that the lens member includes a first zone and a second zone. The first zone has a first incident portion that is disposed on the radiation axis, a first light guide portion that guides light incident from the first incident portion forward, and a first radiation portion that deflects light from the first light guide portion toward the lamp optical axis side and radiates the light forward in a diffused manner. The second zone has a toric second incident portion that is disposed on an outer side of the first incident portion, a second light guide portion that is longer in the direction of the radiation axis than the first light guide portion and that guides light incident from the second incident portion forward, and a toric second radiation portion that radiates the light from the second light guide portion forward.

In some embodiments, the lens member includes a first zone and a second zone on the outer side of the first zone. The first zone has the first incident portion that is disposed on the radiation axis, the first light guide portion that guides light incident from the first incident portion forward, and the first radiation portion that deflects light from the first light guide portion toward the lamp optical axis side, and radiates such light forward in a diffused manner. The second zone has the toric second incident portion that is disposed on the outer side of the first incident portion, the second light guide portion that is longer in the direction of the radiation axis than the first light guide portion and guides light incident from the second incident portion forward, and the toric second radiation portion that radiates light from the second light guide portion forward. Thus, light from the slantingly disposed light emitting element can be radiated in the predetermined lamp optical axis direction in a diffused or concentrated manner, which can lead to both improved use efficiency and improved light distribution control precision of the light from the light emitting element.

In some embodiments, it is preferable that the lens member is disposed in front of the light emitting element so as to correspond in a one-to-one manner, and has a connection portion around the second zone such that the lens member is [JPV1] connected to an adjacent and separate lens member through the connection portion. It is also preferable that the light emitting element is disposed on a single inclined substrate.

According to the vehicular lamp thus configured, by integrating the plurality of lens members through the connection portion, the number of parts can be reduced. Therefore, a cost reduction and greater ease of assembly can be achieved.

In some embodiments, the connection portion is preferably translucent and formed into a single flat plate shape.

According to the vehicular lamp thus configured, a portion of light from the light emitting element can be guided to inside the connection portion and radiated from a front surface of the connection portion in the lamp optical axis direction, whereby light emission from all surfaces including the connection portion can be achieved.

In some embodiments, it is preferable that the first radiation portion is generally circular, and divided into a plurality of sections in a vehicle left-right direction.

According to the vehicular lamp thus configured, by dividing the first radiation portion into a plurality of sections in the vehicle left-right direction, the light distribution performance in the vehicle left-right direction can be further enhanced.

In some embodiments, the second radiation portion is preferably divided into a plurality of sections in a circumferential direction, with each section having a lens element that refracts light incident on the second incident portion in a predetermined direction per section.

According to the vehicular lamp thus configured, the light distribution performance in the circumferential direction can be further enhanced because the second radiation portion is provided with a plurality of lens elements that divides the second radiation portion in the circumferential direction.

In some embodiments, a lens member includes a first zone and a second zone. The first zone has a first radiation portion that deflects light incident from a first incident portion disposed on a radiation axis toward a lamp optical axis side, and radiates such light forward in a diffused manner. The second zone has a toric second radiation portion that radiates forward light from a light guide portion, which is longer in the direction of the radiation axis than the first zone and guides light incident to a toric second incident portion disposed on an outer side of the first incident portion forward. Thus, a light distribution control of light from a slantingly disposed light emitting element can be performed with good precision, and a use efficiency of light from the light emitting element can be improved.

Other aspects, features and advantages will be apparent from the following detailed description, the drawings and the claims.

DETAILED DESCRIPTION

Hereinafter, a first embodiment of a vehicular lamp will be described, based on FIGS. 1 and 2.

Figure 1:
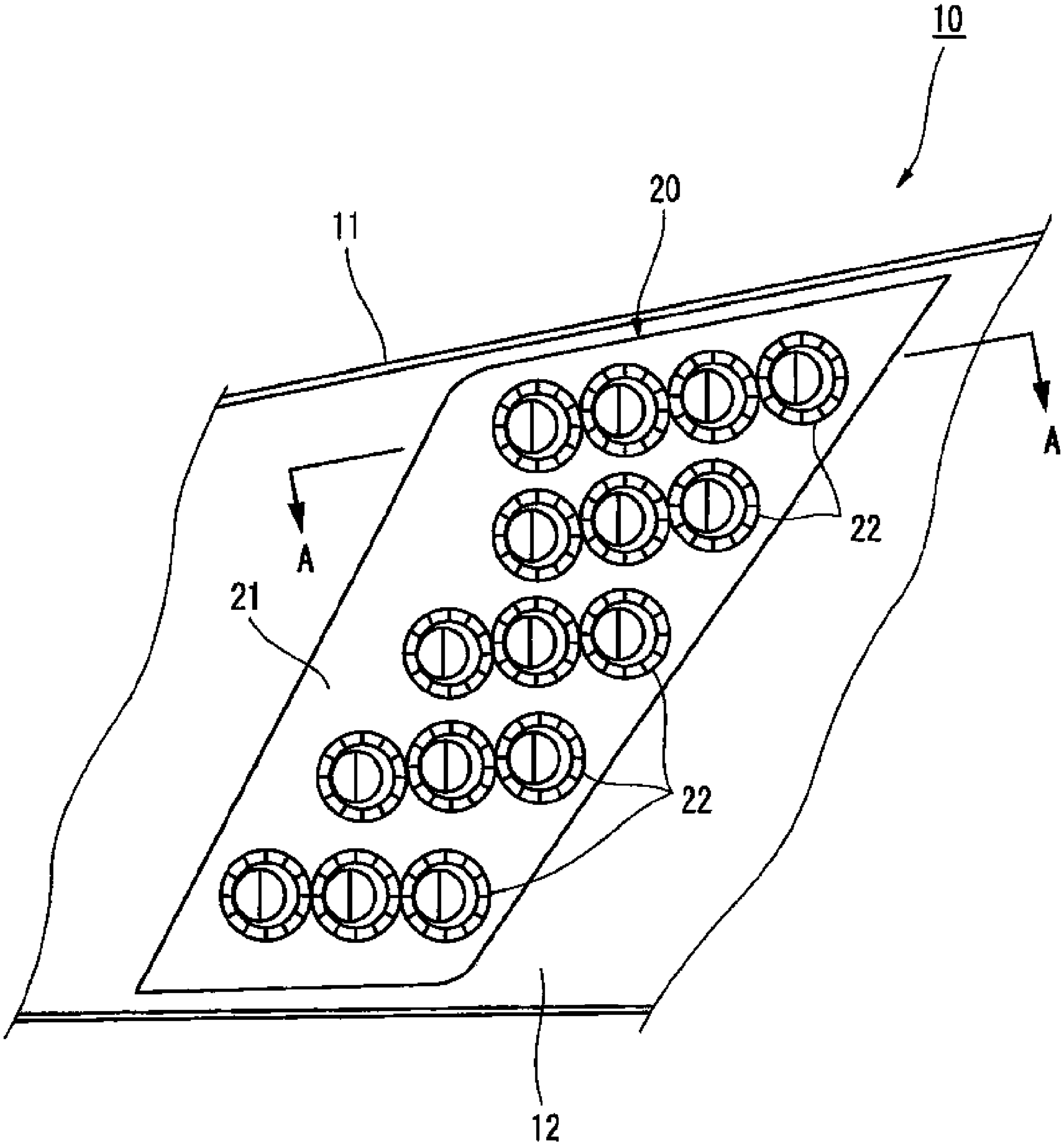
FIG. 1 is a partial frontal view of a vehicular lamp.
Figure 2:
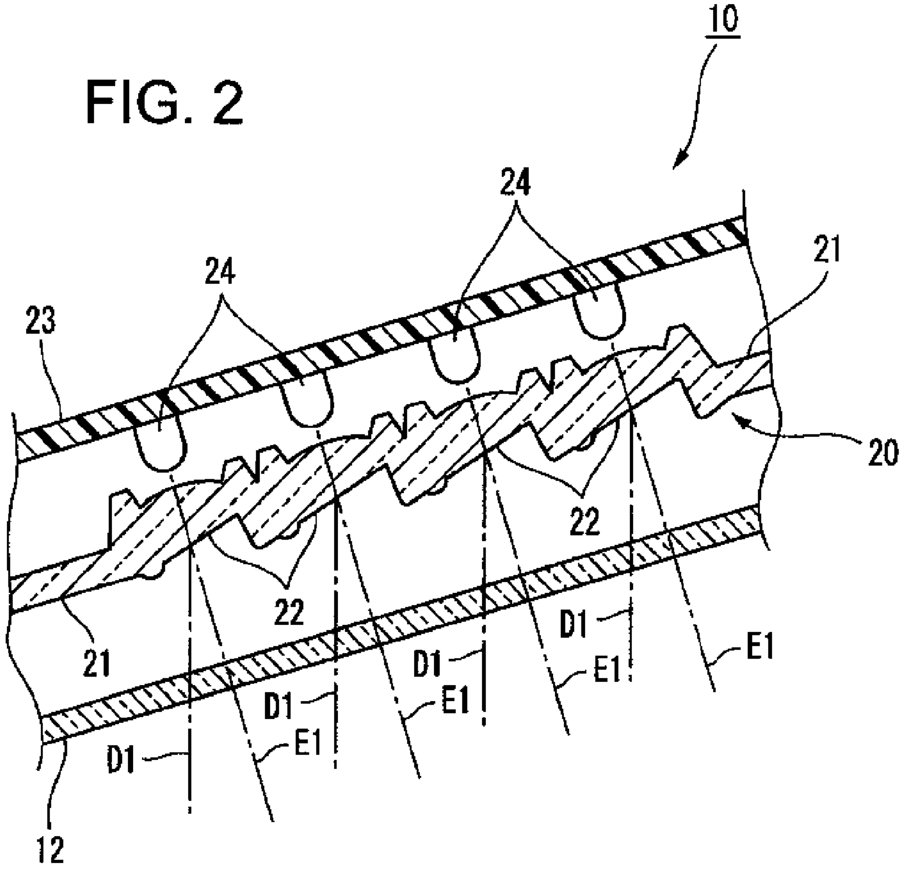
FIG. 2 is a cross-sectional view taken along a line A-A in FIG. 1.

As shown in FIGS. 1 and 2, a vehicular lamp 10 of the present embodiment is applied to a vehicle right-side tail lamp that includes a resin lamp body 11 that is fixed to a vehicle body side and whose vehicle front side is formed open. A colorless and transparent front cover 12 is attached to an opening portion of the lamp body 11. Note that the left side in the drawings corresponds to a vehicle center side, and the right side corresponds to a vehicle right side.

The vehicular lamp 10 further includes a single LED substrate 23, which is disposed inside a lamp chamber that is defined by the lamp body 11 and the front cover 12. A plurality of LEDs 24 is arranged at a predetermined position on the LED substrate 23. The LED 24 is a semiconductor light emitting element. The LED substrate 23 is slanted with respect to a lamp optical axis D1 such that a radiation axis E1 of the LED 24 corresponds to the front cover 12. An inner lens 20 that is slanted in the same manner as the LED substrate 23 is disposed adjacent and immediately in front of the LED substrate 23.

The inner lens 20 is made of acrylic resin, and includes a connection portion 21 having a flat plate shape, and a lens member 22 that is disposed adjacent and in front of the LED 24 so as to correspond in a one-to-one manner with each LED 24. The connection portion 21 is translucent and formed into a single flat plate shape. The connection portion 21 integrally connects multiple adjacent lens members 22. Among multiple laterally arranged lens members 22, end portions of pairs of lens members 22 are directly connected.

Note that the configuration and optical characteristics of the individual lens members 22 are explained in a second embodiment below and therefore not described here.

Next, a second embodiment of the vehicular lamp will be described, based on FIGS. 3 to 6. Note that like reference numerals are used for structural members and effects that are identical to the vehicular lamp 10 above in order to omit overlapping descriptions.

A vehicular lamp 30 according to the present embodiment differs from the first embodiment in that there is a space between pairs of laterally adjacent lens members 22.

Figure 3:
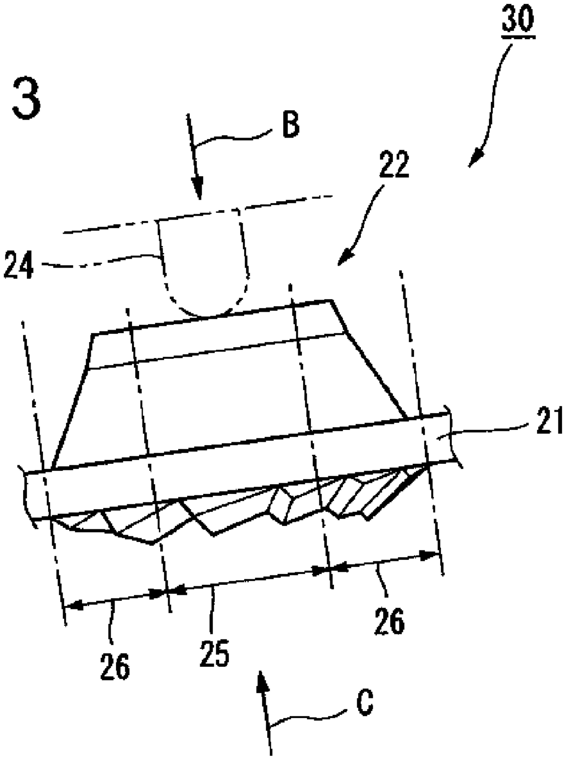
FIG. 3 is a partial plane view of a lens member.

As shown in FIG. 3, the lens member 22 includes a first zone 25 that is centrally disposed and emits light in a point configuration, and a second zone 26 that is disposed on an outer periphery of the first zone and emits light in a ring configuration. Note that a view in the direction of an arrow B in FIG. 3 as seen from a back surface side of the lens member 22 is FIG. 4, and a view in the direction of an arrow C in FIG. 3 as seen from a front surface side of the lens member 22 is FIG. 5.

Figure 4:
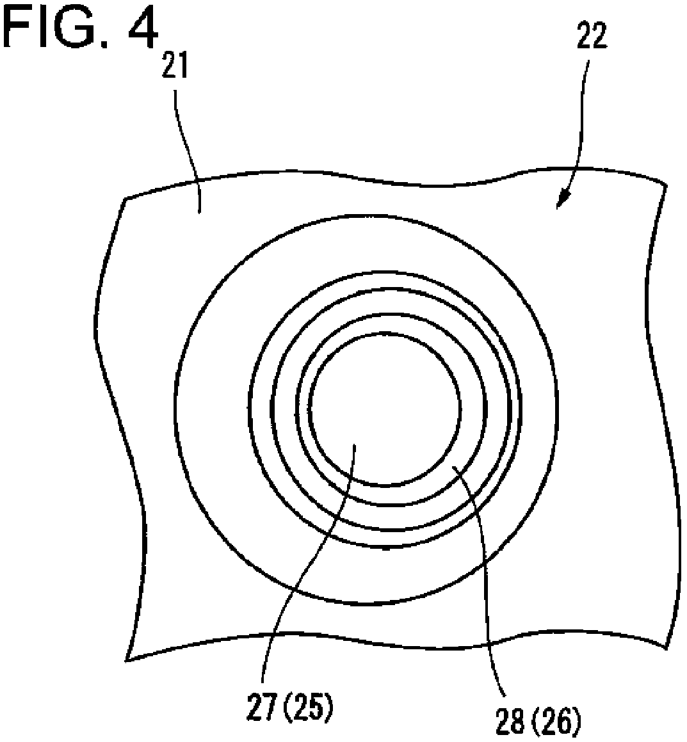
FIG. 4 is a view in the direction of an arrow B in FIG. 3.

As shown in FIG. 4, the back surface side of the lens member 22 includes a first incident portion 27 having a circular convex surface shape at the central first zone 25, and a second incident portion 28 having a toric shape and projecting from the first incident portion 27 at the second zone 26 on the outer periphery of the first incident portion 27. Using the second incident portion 28, light from the LED 24 that cannot be made incident to the first incident portion 27 can be captured inside the lens member 22. Note that the left side in the drawing corresponds to the vehicle right side, and the right side corresponds to the vehicle center side. The left side in the drawing is slanted toward the front side of the paper.

Figure 5:
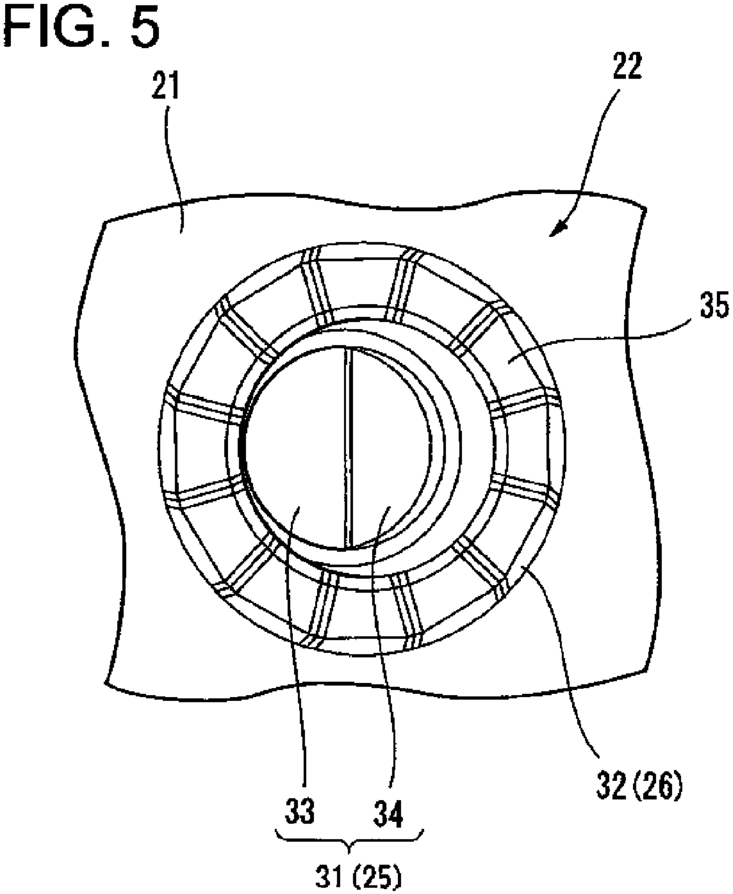
FIG. 5 is a view in the direction of an arrow C in FIG. 3.

As shown in FIG. 5, the front surface side of the lens member 22 includes a first radiation portion 31 having a circular concave surface shape at the central first zone 25, and a second radiation portion 32 having a generally toric shape at the second zone 26 on the outer periphery of the first radiation portion 31. The first radiation portion 31 is circular and divided into two: namely, a first concave surface 33 and a second concave surface 34 that have different curved surfaces in a lamp lateral direction, which is a vehicle left-right direction. Note that the left side in the drawing corresponds to the vehicle center side, and the right side corresponds to the vehicle right side. The right side in the drawing is slanted toward the back side of the paper.

The second radiation portion 32 is divided into twelve sections in a circumferential direction on an outer side of the first radiation portion 31, with each section having a refractive step 35 that is a lens element. Each refractive step 35 refracts light incident to the second incident portion 28 in a predetermined direction per section.

Figure 6:
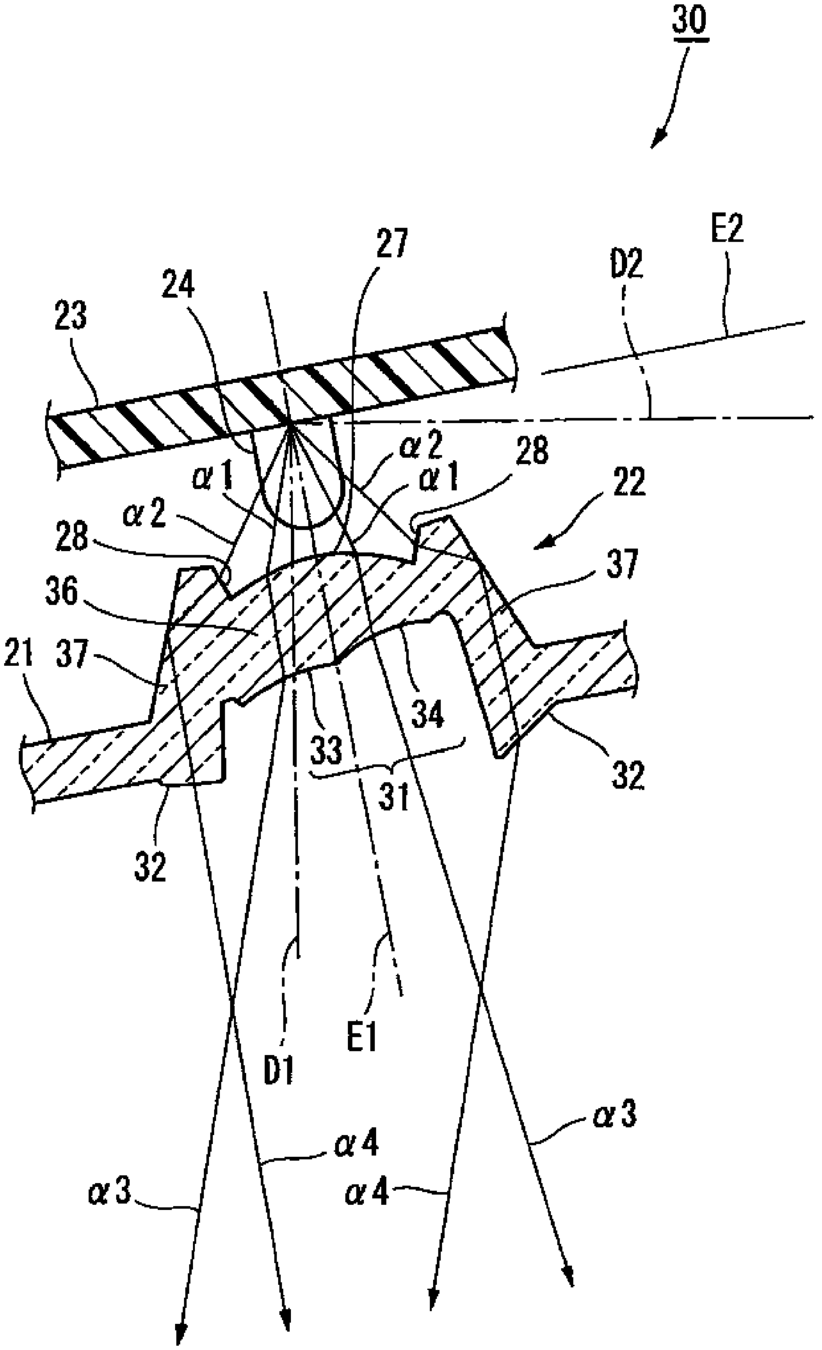
FIG. 6 is a view of a horizontal cross section of the lens member in FIG. 3.

As shown in FIG. 6, the first zone 25 includes: the first incident portion 27 that is disposed on the radiation axis E1; a first light guide portion 36 that guides light incident from the first incident portion 27 forward; and the first radiation portion 31 formed from the first concave surface 33 and the second concave surface 34, which deflect light from the first light guide portion 36 toward the lamp optical axis D1 side and radiate such light forward in a diffused manner.

The second zone 26 includes: the second incident portion 28 that is disposed on an outer side of the first incident portion 27; a generally cylindrical second light guide portion 37 that is longer in the direction of the radiation axis E1 than the first light guide portion 36, and guides light incident from the second incident portion 28 forward; and the generally toric second radiation portion 32 that radiates light from the second light guide portion 37 forward.

A reference plane E2 of the LED substrate 23 that is perpendicular to the radiation axis E1 of the LED 24 is slanted in a vehicle outer direction (upward in the drawing) with respect to the horizontal axis D2. The horizontal axis D2 extends along a vehicle width direction that is perpendicular to the lamp optical axis D1 of the vehicular lamp 10. Thus, the radiation axis E1 of the LED 24 is also slanted in the vehicle outer direction with respect to the lamp optical axis D1 at the same inclination angle as that of the reference plane E2. In addition, the lens member 22 is disposed parallel to the reference plane E2 of the LED substrate 23.

Next, the paths of light $\alpha 1$, $\alpha 2$ radiated from the LED 24 will be described.

The light $\alpha 1$ radiated from the LED 24 toward the first zone 25 of the lens member 22 is incident on a first incident portion 27 that is shaped as a convex surface. The light $\alpha 1$ passes through the first light guide portion 36, whereby the light $\alpha 1$ is guided to the first radiation portion 31 side. The portion of light $\alpha 1$ guided to a first concave surface 33 of the first radiation portion 31 is deflected from the first concave surface 33 toward the lamp optical axis D1 side in a vehicle inner direction with respect to the radiation axis E1, and radiated forward as radiation light $\alpha 3$.

Compared to the portion of light $\alpha 1$ guided to the first concave surface 33, the portion of light $\alpha 1$ guided to the second concave surface 34 of the first radiation portion 31 is deflected relatively less by the second concave surface 34 in the vehicle outer direction with respect to the radiation axis E1, and is radiated forward as the radiation light $\alpha 3$. Thus, a light distribution control in the vehicle left-right direction is performed such that the radiation light $\alpha 3$ from the first radiation portion 31 is overall deflected toward the lamp optical axis D1 side and radiated forward in a diffused manner by the first concave surface 33 and the second concave surface 34 that divide the first radiation portion 31 into two in the vehicle left-right direction.

The light $\alpha 2$ radiated from the LED 24 toward the second zone 26 of the lens member 22 is incident from the toric second incident portion 28 and internally reflected by an outer peripheral surface of the second light guide portion 37, whereby the light $\alpha 2$ is guided to the second radiation portion 32 side. The guided light $\alpha 2$ is radiated forward from the generally toric second radiation portion 32 as radiation light $\alpha 4$. The second radiation portion 32 is formed into twelve divided refractive steps 35 in the circumferential direction and has a lens function that refracts light in a different direction per section (see FIG. 5).

Thus, a light distribution control in the circumferential direction is performed, such that the radiation light $\alpha 4$ from the second radiation portion 32 is deflected overall toward the lamp optical axis D1 side and radiated forward in a cross-diffusion manner by the respectively different refractive steps 35 that divide the second radiation portion 32 in the circumferential direction. Therefore, by synthesizing the light $\alpha 3$ radiated from the first radiation portion 31 and the light $\alpha 4$ radiated from the second radiation portion 32, an overall soft and uniform light emission along the lamp optical axis D1 can be achieved.

Next, a third embodiment of the vehicular lamp will be described, based on FIG. 7. Note that like reference numerals are used for structural members and effects that are identical to the vehicular lamps 10, 30 above in order to omit overlapping descriptions.

Figure 7:
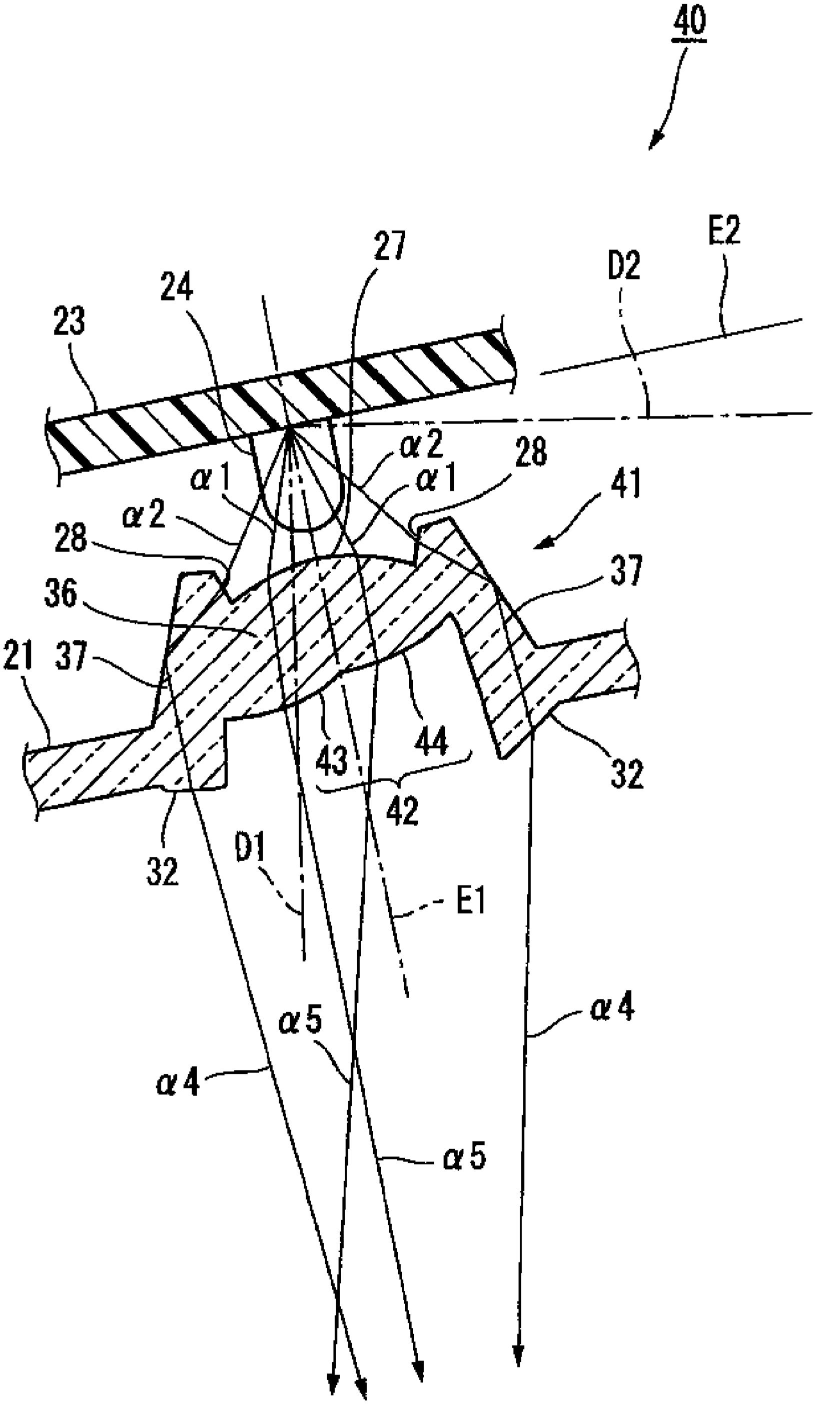
FIG. 7 is a view of a horizontal cross section of a lens member.

As shown in FIG. 7, in a vehicular lamp 40 according to the present embodiment, the configuration of a first radiation portion 42 differs from that of the vehicular lamp 10 described above. That is, the first radiation portion 42 in the first zone 25 is configured from a first convex surface 43 and a second convex surface 44 that divide the first radiation portion 42 into two in the vehicle left-right direction. Note that the vehicular lamp 40 is otherwise identical in configuration to the vehicular lamps 10, 30 described above.

The light $\alpha 1$ radiated from the LED 24 toward the first zone 25 of a lens member 41 is incident on the first incident portion 27 shaped as a convex surface and passes through the first light guide portion 36, whereby the light $\alpha 1$ is guided to the first radiation portion 42 side. Among the guided light $\alpha 1$, a portion of the light $\alpha 1$ is guided to the first convex surface 43, deflected from the first convex surface 43 in the vehicle outer direction with respect to the radiation axis E1, and radiated forward as radiation light $\alpha 5$.

A portion of the light $\alpha 1$ guided to the second convex surface 44 is deflected relatively more from the second convex surface 44 toward the lamp optical axis D1 side in the vehicle inner direction compared to the portion of light $\alpha 1$ deflected by the first convex surface 43 with respect to the radiation axis E1, and is radiated forward as the radiation light $\alpha 5$. Thus, a light distribution control in the vehicle left-right direction is performed such that the radiation light $\alpha 5$ from the first radiation portion 42 is deflected overall toward the lamp optical axis D1 side and radiated forward in a concentrated manner by the first convex surface 43 and the second convex surface 44 that divide the first radiation portion 42 into two in the vehicle left-right direction. Therefore, by synthesizing the light $\alpha 5$ radiated from the first radiation portion 42 in the first zone 25 and the light $\alpha 4$ radiated from the second radiation portion 32 in the second zone 26, an overall clear and uniform light emission along the lamp optical axis D1 can be achieved.

According to the vehicular lamps 10, 30, 40 of the first to third embodiments described above, the lens members 22, 41 include the first zone 25, and the second zone 26 on an outer side of the first zone 25. The first zone 25 includes: the first incident portion 27 that is disposed on the radiation axis E1; the first light guide portion 36 that guides the light $\alpha 1$ incident from the first incident portion 27 forward; and the first radiation portions 31, 42 that deflect the light $\alpha 1$ from the first light guide portion 36 toward the lamp optical axis D1 side, and radiate the light $\alpha 1$ forward in a diffused or concentrated manner.

The second zone 26 includes: the toric second incident portion 28 that is disposed on the outer side of the first incident portion 27; the second light guide portion 37 that is longer in the direction of the radiation axis E1 than the first light guide portion 36, and guides the light $\alpha 2$ incident from the second incident portion 28 forward; and the generally toric second radiation portion 32 that radiates the light $\alpha 2$ from the second light guide portion 37 forward. Thus, the light $\alpha 1$, $\alpha 2$ from the slantingly disposed LED 24 can be radiated in the predetermined lamp optical axis D1 direction in a diffused or concentrated manner, which can realize both improved use efficiency and improved light distribution control precision of the light $\alpha 1$, $\alpha 2$ from the LED 24.

The lens members 22, 41 are disposed in front of the LED 24 so as to correspond in a one-to-one manner. The lens members 22, 41 also have the connection portion 21 around the second zone 26 and are integrally connected to adjacent and separate lens members 22, 41 through the connection portion 21. In addition, the LED 24 is disposed on a single inclined LED substrate 23. Thus, by integrating the plurality of lens members 22, 41 through the connection portion 21, the number of parts can be reduced, and a cost reduction and greater ease of assembly can be achieved as well.

The connection portion 21 is translucent and formed into a single flat plate shape. Thus, a portion of light from the LED 24 can be guided to inside the connection portion 21 and radiated from a front surface of the connection portion 21 in the lamp optical axis D1 direction, whereby light emission from all surfaces including the connection portion 21 can be achieved.

In addition, the first radiation portions 31, 42 are divided into two in the vehicle left-right direction. Thus, it is possible to further enhance the light distribution performance in the vehicle left-right direction. This is achieved with particular effectiveness in the inner lens 20 that is slantingly disposed.

The second radiation portion 32 is divided into twelve sections in the circumferential direction, with each section having a refractive step 35 that refracts the light $\alpha$2 incident to the second incident portion 28 in a predetermined direction per section. Thus, it is possible to further enhance the light distribution performance of the second radiation portion 32 in the circumferential direction.

Note that the present invention is not limited to the embodiments described above, and may be modified, improved, and so forth as appropriate. In addition, the structural elements used in the embodiments described above are not limited in terms of material, shape, dimension, value, form, number, layout, or the like.

What is claimed is:

1. A vehicular lamp comprising:

a lamp chamber formed from a lamp body and a front cover;

a plurality of light emitting elements disposed within the lamp chamber, where a radiation axis of each light emitting element is inclined with respect to a lamp optical axis; and a plurality of lens members disposed in front of the light emitting elements, wherein each lens member comprises:

a first zone having a first incident portion disposed on the radiation axis of a light emitting element, a first light guide portion that guides light incident from the first incident portion forward, and a first radiation portion that deflects light from the first light guide portion toward the lamp optical axis side and radiates the light forward in a diffused manner; and a second zone having a toric second incident portion that is disposed on an outer side of the first incident portion, a second light guide portion that is longer in the direction of the radiation axis of a light emitting element than the first light guide portion and guides light incident from the second incident portion forward, and a toric second radiation portion that radiates the light from the second light guide portion forward; and wherein each lens member is disposed in front of an associated one of the light emitting elements so as to correspond in a one-to-one manner, and each lens member has a connection portion around the second zone such that the lens member is integratedly connected to an adjacent and separate lens member through the connection portion, and the light emitting elements are disposed on a single inclined substrate.

2. The vehicular lamp according to claim 1, wherein the connection portion is translucent and formed into a single flat plate shape.

3. The vehicular lamp according to claim 1 , wherein the first radiation portion is generally circular, and divided into a plurality of sections in a vehicle left-right direction.

4. The vehicular lamp according to claim 1 , wherein the second radiation portion is divided into a plurality of sections in a circumferential direction, with each section having a lens element that refracts light incident to the second incident portion in a predetermined direction per section.

5. A vehicular lamp comprising:

a lamp chamber formed from a lamp body and a front cover;

a plurality of light emitting elements disposed within the lamp chamber, wherein the light emitting elements are disposed on a single inclined substrate and wherein a radiation axis of each semiconductor light emitting element is inclined with respect to a lamp optical axis; and a plurality of lens members disposed in front of the light emitting elements so as to correspond in a one-to-one manner, wherein each lens member comprises:

a first zone having a first incident portion disposed on the radiation axis of a light emitting element, a first light guide portion that guides light incident from the first incident portion forward, and a first radiation portion that deflects light from the first light guide portion toward the lamp optical axis side and radiates the light forward in a diffused manner, wherein the first radiation portion is generally circular and divided into a plurality of sections in a vehicle left-right direction;

a second zone having a toric second incident portion that is disposed on an outer side of the first incident portion, a second light guide portion that is longer in the direction of the radiation axis of a light emitting element than the first light guide portion and guides light incident from the second incident portion forward, and a toric second radiation portion that radiates the light from the second light guide portion forward, wherein the second radiation portion is divided into a plurality of sections in a circumferential direction, with each section having a lens element that refracts light incident to the second incident portion in a predetermined direction per section; and a connection portion around the second zone such that the lens member is integratedly connected to an adjacent and separate lens member through the connection portion, wherein the connection portion is translucent and formed into a single flat plate shape.

* * * * *